United States Patent [19]

Yamamura et al.

[11] 3,963,906
[45] June 15, 1976

[54] COMPACT ELECTRONIC CALCULATOR

[75] Inventors: Katsumi Yamamura; Kouji Kakizawa; Minoru Hosokawa, all of Suwa, Japan

[73] Assignee: Kabushiki Kaisha Suwa Seikosha, Tokyo, Japan

[22] Filed: Nov. 9, 1973

[21] Appl. No.: 414,477

Related U.S. Application Data

[63] Continuation of Ser. No. 199,189, Nov. 16, 1971.

[30] Foreign Application Priority Data

Nov. 17, 1970  Japan.............................. 45-100708

[52] U.S. Cl. ............................................... 235/152
[51] Int. Cl.² ............................................ G06F 15/2
[58] Field of Search ....................... 235/156, 152; 340/365 R, 365 L; 350/160 LC; 178/18, 19, 20; 335/206

[56] References Cited
UNITED STATES PATENTS

| | | |
|---|---|---|
| 2,546,647 | 3/1951 | Marble et al. ................... 335/206 X |
| 3,129,302 | 4/1964 | Postel............................. 340/365 L |
| 3,469,242 | 9/1969 | Eachus et al.................... 340/365 L |
| 3,499,112 | 3/1970 | Heilmeier et al. ............. 350/160 LC |
| 3,506,939 | 4/1970 | Hesser et al. ........................ 335/206 |
| 3,548,179 | 12/1970 | Kimura et al. ...................... 235/156 |
| 3,652,148 | 3/1972 | Wysocki et al. .............. 350/160 LC |
| 3,713,056 | 1/1973 | Hosokawa........................... 335/206 |
| 3,750,062 | 7/1973 | Goto ............................. 340/365 L |
| 3,781,865 | 12/1973 | Yamazaki ........................... 340/336 |
| 3,819,921 | 6/1974 | Kilby et al. ........................ 235/156 |

*Primary Examiner*—David H. Malzahn
*Attorney, Agent, or Firm*—Blum, Moscovitz, Friedman & Kaplan

[57] ABSTRACT

A compact electronic calculator having an input circuit defined by a plurality of lead switches mounted beneath an operative surface for selective actuation by a manually manipulatable permanent magnet. The calculator further includes a calculating circuit coupled to said input circuit and formed from LSI elements, display means formed from liquid crystal display elements and a battery power source.

4 Claims, 3 Drawing Figures

COMPACT ELECTRONIC CALCULATOR

This is a continuation of application Ser. No. 199,189, filed Nov. 1, 1971.

BACKGROUND OF THE INVENTION

This invention relates to compact electronic calculators of the portable type, and in particular, to miniaturized electronic calculators. In the art, many attempts have been made to miniaturize desk-type electronic calculators, electronic "soroban" and the like through the use of integrated circuits. However, the keyboard input arrangement of desk calculators occupies a large volume of space, is relatively heavy, and is relatively costly. This is true even where said keyboard incorporates a lead switch actuated by a permanent magnet mounted on the key. Further, the calculating circuitry in the prior art arrangements has generally consisted of a combination of MSI (Middle Scaled Integrated) circuits. However, the interconnection between said circuits results in an increase in the volume of the calculator, as well as an increase in the labor costs associated with the production thereof. Further, such circuits require substantial amounts of power, so that it is impossible to use a battery by itself as the power source.

Further, in the prior art arrangements, large-sized display devices such as the Nixey tube or the digitron are used. Such display devices occupy a large volume of space, and consume substantial quantities of power, so that a small-sized battery cannot be relied upon as the power source. Thus, in the art, the size of the various components, including the power source, have limited the extent of miniaturization possible in the case of electronic calculators, and have further limited the weight and cost thereof.

SUMMARY OF THE INVENTION

Generally speaking, in accordance with the invention, a compact electronic calculator is provided comprising an input circuit having a base plate having an operative surface on one side thereof, a plurality of lead switches positioned on the opposite side of said base plate adjacent a plurality of respective predetermined locations, and permanent magnet means manually manipulatable toward and away from an operative position adjacent each of said predetermined locations at which the respective lead switch is actuated. The calculator also includes a calculating circuit having a LSI (large scaled integrated) circuit, display means having liquid crystal display elements and a battery power source.

Accordingly, it is an object of this invention to provide a compact electronic calculator which is miniaturized to the maximum extent, being both light in weight and relatively inexpensive to manufacture.

Still another object of the invention is to provide a compact electronic calculator which can be powered by a widely-used compact dry cell type battery.

Still other objects and advantages of the invention will in part be obvious and will in part be apparent from the specification and drawing.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENTS

Figure 1:
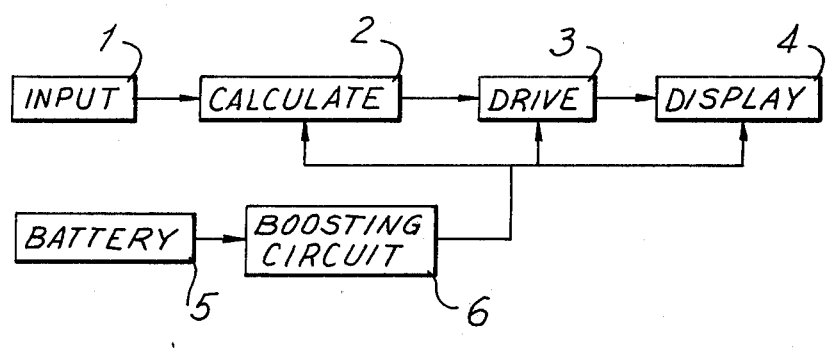
FIG. 1 is a block diagram of a compact electronic calculator according to the invention.

Referring now to FIG. 1, a block diagram of the compact electronic calculator according to the invention is depicted. Said calculator consists of an input circuit 1, which is coupled to a calculating circuit 2 for performing the calculation function on the signals applied from said input circuit. The signal from calculating circuit 2 is applied to a driving circuit 3 which drives a display device 4. A small-sized battery 5, preferably of the conventional dry cell type is coupled through a boosting circuit 6 to each calculating circuit, driving circuit and display device. Boosting circuit 6 boosts the voltage output of the battery to the level required for driving said calculating circuit, driving circuit and display device.

Figure 2:
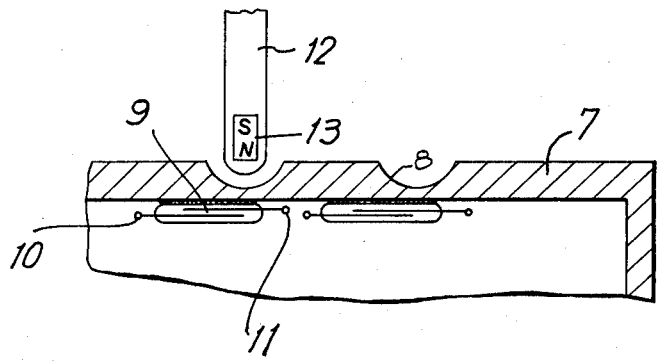
FIG. 2 is a sectional schematic diagram of the input portion of the compact electronic calculator of FIG. 1.

The novel input circuit according to the invention is depicted In FIG. 2, wherein the calculator case 7 is provided with an operative surface having a plurality of recesses 8 formed therein. The number of recesses 8 provided in the operative surface of case 7 is equal to the number of input signals required for the device. Thus, one of said recesses would be associated with each of the 10 digits (0–9), as well as with each of the functioning signals such as +, −, ×, ÷, =, "clear", and the like. A plurality of lead switches 9 are positioned on the inner surface of case body 7, one of said lead switches being associated with each of said recesses. Each of said lead switches are positioned so that the contact elements thereof are laterally spaced from the center line of the associated recess 8 so as to lie in the path of the lines of magnetic flux produced by permanent magnet 13 mounted on bar 7. Each lead switch 9 is adapted so that a circuit is closed between contacts 11 and 12 when permanent magnet 13 is brought into the associated recess 8. The permanent magnet 13 is formed with poles substantially aligned with an axis extending normally to the operative surface of case 7.

The input device of FIG. 2 is utilized by manually manipulating the bar 12 so as to selectively position the permanent magnet in the recess associated with the particular input to be applied to the computer. When this is done, an input signal is applied to calculating circuit 2. Since the lead switch 9 is secured directly to the inner surface of case 7, and since the operative permanent magnet and rod are separate from the case, substantial miniaturization results from the application of said input circuit. Further, the input circuit of FIG. 2 is substantially less expensive and lighter in weight than the conventional keyboard input circuit. Lead switches, which form the heart of the input device according to the invention are now used in large-size calculators, and have been found to provide high efficiency and endurance so that a high quality input means is provided, with the chance of misoperation substantially eliminated.

Calculating circuit 2 according to the invention employs a LSI (Large Scaled Integrated) circuit which is particularly advantageous for the miniaturization of the circuit, the reduction in cost, the reduction of labor for interconnection of circuit elements, high endurance, and high efficiency. By using MOS-type LSI, power consumption and cost can be further reduced.

Figure 3:
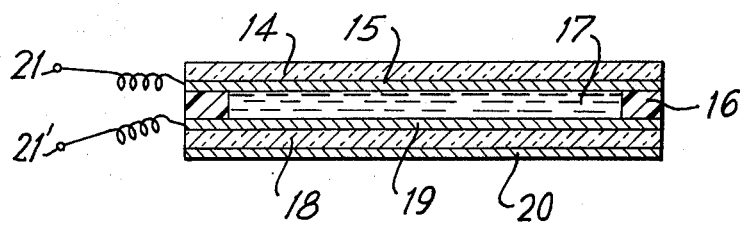
FIG. 3 is a sectional view of an element of the display portion of the compact electronic calculator of FIG. 1.

Referring now to FIG. 3, one element of the display device according to the invention is depicted. Said display device uses a liquid crystal display element applying the electro-light scattering effect. Each liquid crystal display element consists of liquid crystal material sandwiched between two electrode plates and held in place by means of an insulating spacer. At least one of said electrode plates is transparent. When voltage is applied between the two electrode plates, the alignment of the molecules of the liquid crystal is disturbed so that light applied thereto will be scattered. This light scattering effect is applied as the display means in the display device according to the invention. The liquid crystal display element incorporated in the compact electronic computer according to the invention has a number of advantages over the prior art display elements such as luminous diodes, Nixey tubes, Braun tubes, or digitrons. These advantages are as follows:

1. The brighter the environment is, the more readily the display can be distinguished.

2. Power consumption per display area is about 100 mw/cm$^3$ and is very small compared with that of other display elements.

3. The thickness of the liquid crystal is about $20\mu$, so that a flat display can be produced. This feature, which is impossible with the Braun tube or with the Nixey tube, results in a compact display device.

4. The cost per display area is much lower than that of the other display elements.

In the embodiment of FIG. 3, the display device according to the invention consists of a transparent glass base plate 14 having a transparent electrode film 15 coated on the inner surface thereof. Liquid crystal substance 17 is retained between electrode 15, insulating spacers 16, and an electrode 19 deposited on the inner surface of transparent glass base 18. A light reflecting film 20 is deposited on the outer surface of glass plate 18, preferably by means of evaporation of a metal. Lead terminals 21 and 21' are connected to electrodes 15 and 19 respectively for applying a voltage between said two electrodes. If a power source is connected to said lead terminals, an electric field would be applied to the liquid crystal thin film 17, and light would be scattered in the region between said electrodes. To define the desired display, one or more of the electrodes 15 and 19 would be formed as segmented electrodes defining the numerical or other indicia to be displayed so that only the portion of the liquid crystal defining the figure to be displayed would be effected by the electric field. Lead terminals 20 and 21' would thus be connected to driving circuit 3.

The liquid crystal display is particularly adapted for application in electronic calculators due to its small size, its low power consumption and cost, and its high efficiency. Accordingly, all of the above-described components of the compact electronic computer according to the invention contribute to the production of a low-priced extremely miniaturized arrangement.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A compact electronic calculator comprising input circuit means having a base plate formed with an operative surface on an outer side thereof, said operative surface having a plurality of recesses formed at predetermined locations thereon, a reed switch positioned on an inner side of said base plate adjacent each of said predetermined locations on said base plate, and a permanent magnet unconnected to said base plate and manually manipulatable by a user toward and away from said recesses, said permanent magnet actuating only the reed switch associated with the recess in which it is received, said reed switch returning to its unactuated state upon removal of said permanent magnet; calculating circuit means coupled to said input circuit means for receiving signals therefrom, said calculating means being formed from an LSI circuit; display means coupled to said calculating circuit means for receiving a signal therefrom, said display means including liquid crystal display elements; and a battery power source coupled to said calculating circuit means and display means for driving same.

2. A compact electronic calculator as recited in claim 1, wherein said base plate is essentially flat and, defines a portion of the case of said calculator.

3. A compact electronic calculator as recited in claim 1, wherein said permanent magnet is oriented with the poles thereof extending substantially normally to the outer surface of said base plate, said reed switches having switching elements offset laterally relative to the base of said recesses.

4. A compact electronic calculator as recited in claim 3, wherein said input circuit means includes a rod member having said permanent magnet mounted at one end thereof for the manual manipulation of said permanent magnet.

* * * * *